Figure 1:
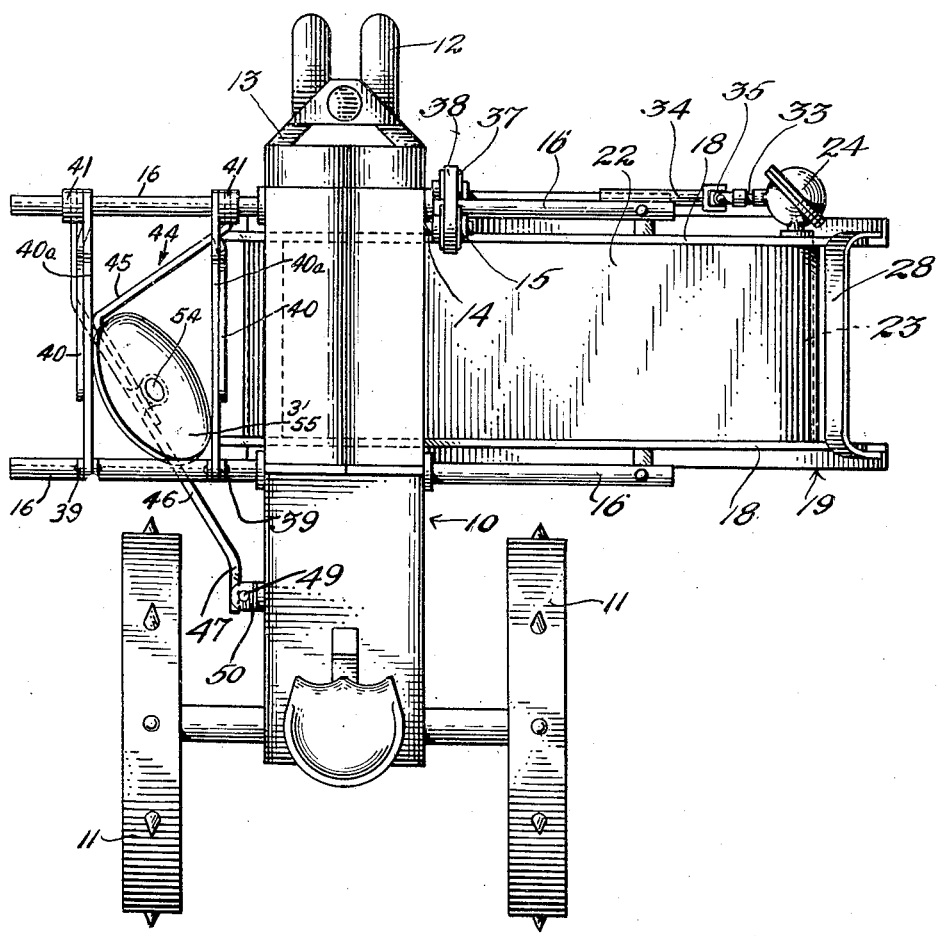

Feb. 21, 1950 W. L. DODSON ET AL 2,498,156
TERRACING MACHINE
Filed Sept. 10, 1945 4 Sheets-Sheet 1

Inventors
WALTER L. DODSON
AND JAMES E. WILSON,

By Clarence A. O'Brien
and Harvey B. Jacobson
Attorneys

Feb. 21, 1950    W. L. DODSON ET AL    2,498,156
TERRACING MACHINE
Filed Sept. 10, 1945    4 Sheets-Sheet 2
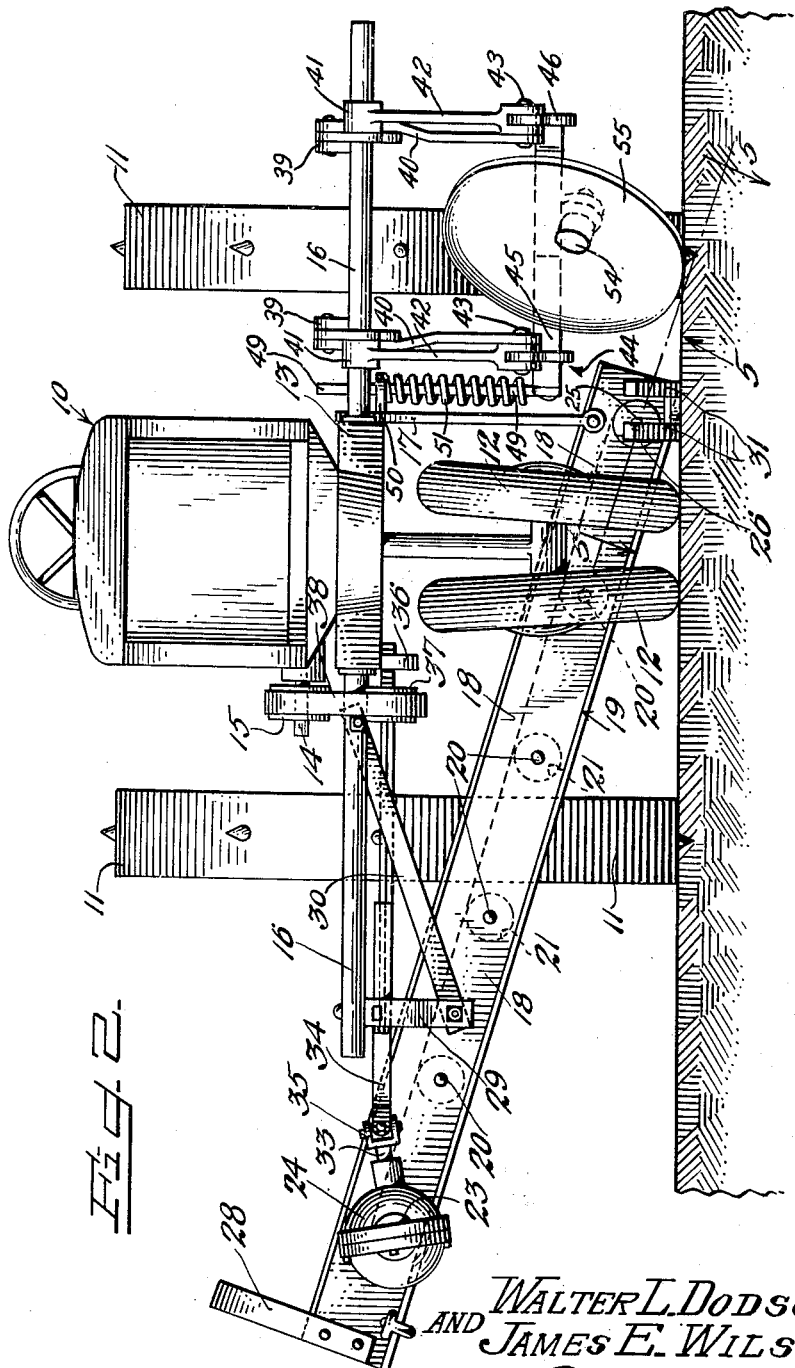
Inventors
WALTER L. DODSON
AND JAMES E. WILSON,
By Clarence A. O'Brien
and Harvey B. Jacobson
Attorneys

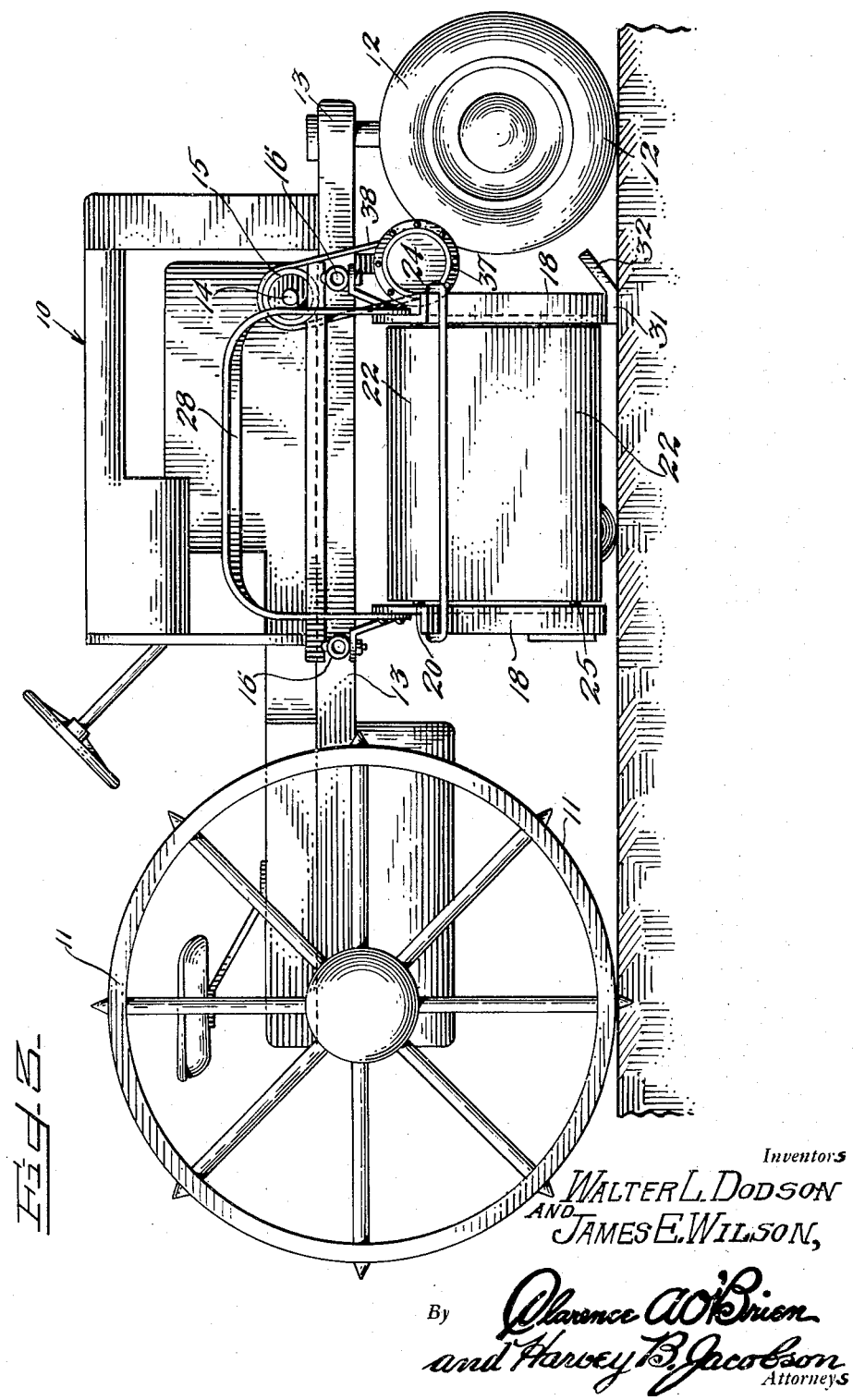

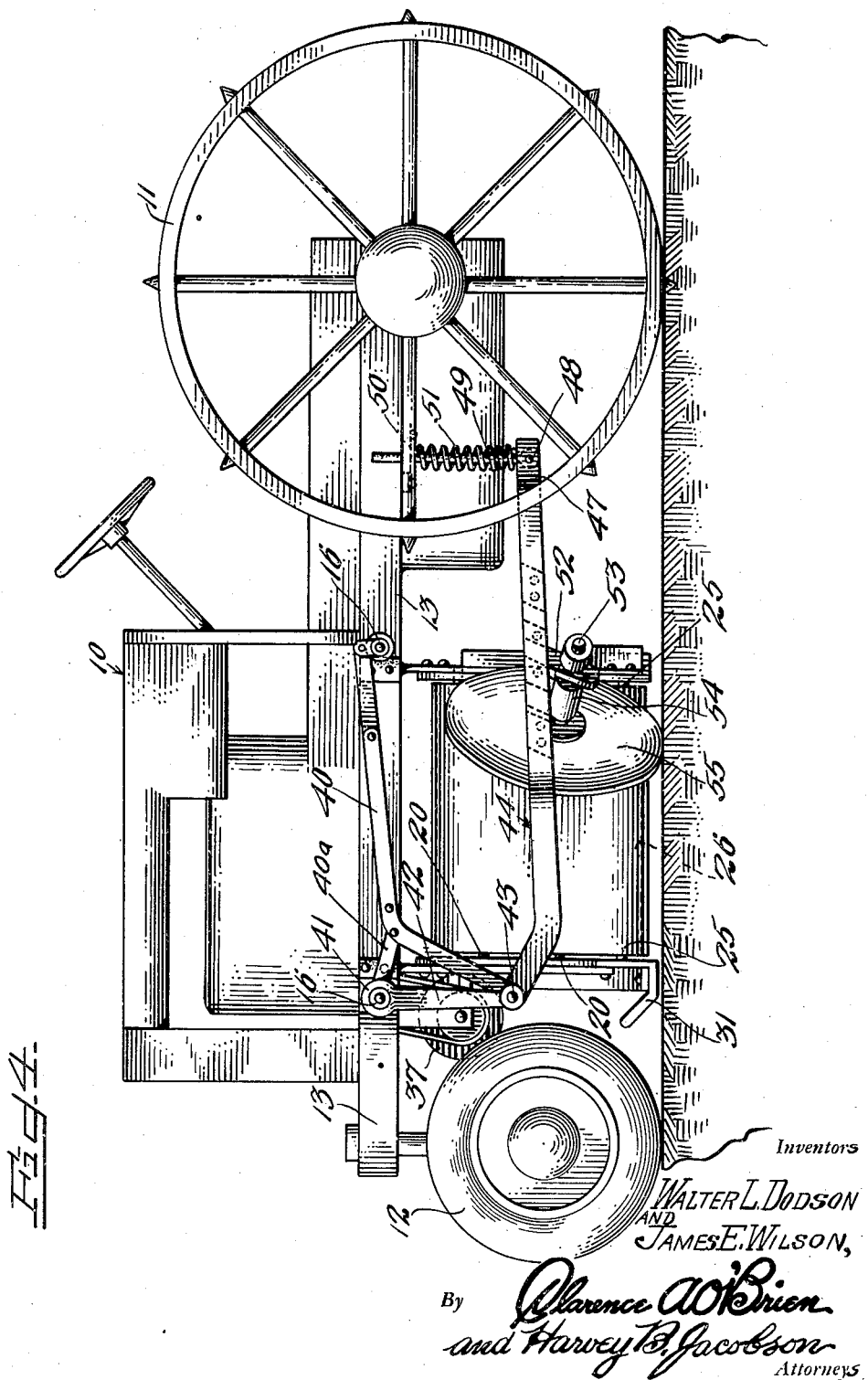

Patented Feb. 21, 1950

2,498,156

UNITED STATES PATENT OFFICE 2,498,156

TERRACING MACHINE

Walter L. Dodson and James E. Wilson, Brady, Tex.; said Dodson assignor to said Wilson Application September 10, 1945, Serial No. 615,330

1 Claim. (Cl. 37—110)

This invention relates to a terracing machine, and more particularly to an attachment for a farm tractor or the like by which earth may be moved to an elevated position to form a terrace.

The primary object of the invention is to move earth transversely of the path of travel of the machine to which the device is attached and deposit it to one side thereof in the form of a terrace of uniform height and contour.

Another object of the invention is to facilitate the terracing and ditching of land for irrigation purposes.

Among its features, the invention embodies an elevator adapted to be suspended below the frame of a farm tractor or the like and extending transversely thereof, means for driving the elevator from the power takeoff of the tractor, and a shovel supported on the tractor adjacent the lower end of the elevator in such a position as to deliver earth onto the elevator so that it may be raised to the discharge end thereof and deposited in the form of a terrace.

Other features include means to yieldingly urge the shovel into contact with the earth over which the tractor is operating, and means to prevent the deposit or packing of the earth on the elevator rollers between the upper and lower runs of the elevator belt.

Still other features embody novel supporting means by which the elevator and shovel are suspended in proper position beneath the tractor.

Figure 5:
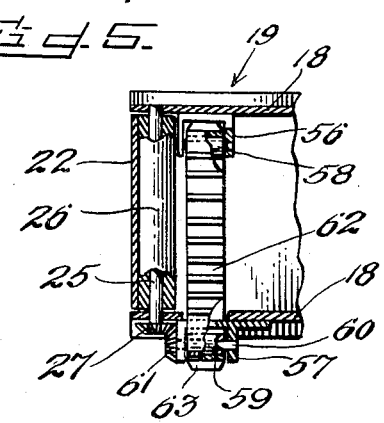

In the drawings:

Figure 1 is a top plan view of a tractor equipped with this improved terracing attachment, Figure 2 is a front view of the tractor illustrated in Figure 1, Figure 3 is a side view of the tractor showing the discharge end of the elevator, Figure 4 is a side view from the opposite side, and Figure 5 is a fragmentary sectional view taken substantially on the line 5—5 of Figure 2.

Referring to the drawings in detail, a tractor designated generally 10, is provided with the usual driving wheels 11 and steering wheels 12 upon which a chassis or frame 13 is carried. The tractor is provided with the usual power takeoff shaft 14 and attached thereto is a drive pulley 15, the purpose of which will more fully hereinafter appear.

Secured to the frame or chassis 13 intermediate the steering wheels 12 and the drive wheels 11 are spaced parallel supporting bars 16 which project horizontally and form the suspension means upon which the terracing apparatus is supported.

Depending from the bars 16 on one side of the frame 13 and located adjacent said frame are links 17, the lower ends of which are attached to the side frame members 18 of an elevator designated generally 19. The elevator above referred to comprises, in addition to the side frame members, a plurality of transversely extending spaced shafts 20 upon which conveyor belt supporting rollers 21 are mounted. These rollers 21 support a conveyor belt 22, and extending transversely of the frame members adjacent their upper ends is a drive roller 23 which is adapted to be driven through a suitable gear train contained within a housing 24 mounted adjacent the foremost side rail 18 of the elevator 19. Extending between the side rails 18 adjacent their lower ends is a transversely extending shaft 25 supporting a roller 26 over which the lower end of the elevator belt 22 runs, and carried at one end of the drive shaft 25 is a bevel pinion 27, for a purpose to be more fully hereinafter explained. A suitable arch-shaped bracket member 28 connects the upper ends of the side rails 18 to hold them in spaced parallel relation at this point. The upper end of the elevator 19 is supported on a pair of spaced brackets 29 which, in turn, are suspended from the bars 16 on the side of the machine opposite which the suspension rods 17 are attached, and suitable brace members 30 are connected to the lower ends of the brackets 29 and to the bars 16 to which they are attached near the side of the frame 13, as will be readily understood upon reference to Figure 2. Secured to the side rails 18 of the elevator 19 adjacent their lower ends and projecting forwardly therefrom is a pair of spaced guide shoes 31 which are adapted to ride along the ground, as shown in Figure 3. The forward ends of these shoes are turned upwardly, as at 32, so as to facilitate their travel and avoid digging into the surface being traversed.

Leading from the gear housing 24 is a shaft 33 to which a shaft 34 is attached through the medium of a universal joint 35. The shaft 34 is preferably telescopic, as will be readily understood upon reference to Figures 1 and 2, and the end opposite that which is connected with the universal joint 35 is journaled in a suitable bracket 36 carried by the frame 13 near the power takeoff shaft 14. A drive pulley 37 is attached to the shaft 34 adjacent the bearing 36 and has driving connection with the pulley 15 through the medium of a belt 38 so that driving connection is established between the power takeoff shaft 14 and the elevator drive roller 23.

Secured to the rearmost bar 16 on the side of the tractor opposite that from which the elevator 19 projects are spaced pairs of parallel ears 39 carrying forwardly extending parallel bars 40a which are provided, adjacent their forward ends, with eyes 41 mounted on the forward bar 16. A pair of substantially V-shaped brace members 40 are secured adjacent the forward end portions of the bars 40a. Arms 42 projecting downwardly from the eyes 41 are pivotally supported, as at 43, to the lower ends of the brace members 40. To the lower ends of said arms 42 is a frame designated generally 44. Frame 44 comprises a pair of convergent bars 45 which meet at a point approximately in line with the longitudinal axis of the elevator 19 and one of the bars continues rearwardly, as at 46, and diagonally toward the frame 13, as will be readily seen upon reference to Figure 1, and terminates in an extension 47 which projects in a plane substantially parallel with the side of the frame or chassis. Pivoted, as at 48, adjacent the rear end of the extension 47 is a vertically extending rod 49, the upper end of which is slidably mounted in a bracket 50 attached to and projecting laterally from the under side of the parallel side bar of the chassis or frame 13, and surrounding the rod 49 between the under side of the bracket 50 and the upper edge of the extension 47 is a compression coil spring 51 which normally urges the rear end of the frame 44 downwardly. Attached to the angularly extending portion 46 of the frame 44 is a depending bracket 52 in which a trunnion 53 is secured. This trunnion forms an extension on the end of a cylindrical body 54 which projects toward the longitudinal axis of the elevator 19 and carries, at its inner end, a dished disk 55 which serves as a shovel to load the lower end of the elevator, as will be readily appreciated upon reference to Figure 2. As shown, the cylindrical member 54 extends slightly upwardly so that the disk 55 will be tilted at an angle to direct the earth contacted by it onto the elevator.

Attached to the side rails 18 of the elevator 19 adjacent the roller 26 at the lower end thereof are suitable brackets 56 and 57. The bracket 56 supports an idler roller 58 located between the runs of the belt 22 while the bracket 57 supports a drive roller 59 on a shaft 60, to one end of which is attached a bevel pinion 61 which meshes with the pinion 27 so that, as the roller 26 operates under the influence of the movement of the belt 22, the drive roller 59 will also be rotated. Trained over the idler roller 58 and the drive roller 59 is a transversely extending conveyor belt 62 carrying wipers 63 which are adapted to engage the inner face of the lower run of the belt 22 to sweep away any earth that may work its way downwardly onto the lower run between the side edges of the upper run of the belt 22 and the side rails 18 of the elevator 19.

From the foregoing, it will be understood that the tractor moving in a rectilinear path will advance the disk 55 in such a manner that it will serve as a shovel to engage the earth being traversed and cause it to be deposited upon the lower end of the elevator 19. Upon setting the power take-off shaft 14 of the tractor 10 into operation, the elevator belt 22 will be driven through the medium of the drive belt 38, the shaft 34, universal joint 35, shaft 33, and the gears within the housing 24 driving the drive roller 23 of the conveyor belt 22 of the elevator. It is obvious that if so desired suitable cleats or flights may be secured to the belt 22 so that the earth deposited on the lower end of the elevator will be moved toward the upper discharge end thereof from which it is deposited in the desired position to produce a terrace. It is evident, of course, that some of the earth being moved by the belt 22 will sift through the space between the side edges of the belt and the side rails 18 of the elevator 19 so as to be deposited on the inner face of the lower run of the belt 22. In order to prevent the earth so deposited from interfering with the proper operation of the device, the conveyor 62 is operated so that the wiper 63 sweeps the inner face of the lower run of the belt 22 to remove earth deposited thereon and prevent it from caking between the belt 22 and the roller 26.

While in the foregoing there has been shown and described the preferred embodiment of this invention, it is to be understood that minor changes in the details of construction and combination and arrangement of parts may be resorted to without departing from the spirit and scope of the invention as claimed.

What is claimed is:

In a terracing device a farm tractor having a power take-off, a pair of spaced parallel arms extending outwardly from each side of the tractor in the same horizontal plane, an inclined elevator having its lower end suspended beneath the tractor from a pair of arms on one side thereof, said elevator extending from the side of the tractor opposite that from which its lower end is suspended upwardly and outwardly beyond the ends of the arms opposite those upon which its lower end is suspended, drive means coupling the elevated end of the elevator with the power take-off of the tractor, a bracket carried by the arms on the tractor opposite those upon which the lower end of the elevator is suspended, a frame pivoted to the bracket directly below the foremost arm, a forwardly and upwardly inclined shovel carried intermediate the ends of the frame for directing earth toward and onto the lower end of the elevator and yielding means pivoted to the end of the frame opposite its pivoted end and engaging the tractor frame for urging the shovel downwardly into earth contacting position.

WALTER L. DODSON.
JAMES E. WILSON.

REFERENCES CITED

The following references are of record in the file of this patent:

UNITED STATES PATENTS

| Number | Name | Date |
| --- | --- | --- |
| 161,524 | Lasher | Mar. 30, 1875 |
| 403,035 | Bunnell | May 7, 1889 |
| 688,156 | Bunnell | Dec. 3, 1901 |
| 743,487 | Gray | Nov. 10, 1903 |
| 1,658,354 | Ronning et al. | Feb. 7, 1928 |
| 1,767,992 | Lilly | June 24, 1930 |
| 2,089,319 | Wooley et al. | Aug. 10, 1937 |
| 2,280,234 | Harvey | Apr. 21, 1942 |
| 2,280,473 | Brown | Apr. 21, 1942 |